US012586432B2

(12) United States Patent
Measom et al.

(10) Patent No.: US 12,586,432 B2
(45) Date of Patent: Mar. 24, 2026

(54) SEPARATION SYSTEMS, TAILGATING AND PIGGYBACKING DETECTION DEVICES, AND RELATED COMPUTER PROGRAM PRODUCTS FOR CONTROLLING ACCESS TO A RESTRICTED AREA AND RELATED METHODS

(71) Applicant: Boon Edam, Inc., Lillington, NC (US)

(72) Inventors: Kurt J. Measom, Lillington, NC (US); Bradley S. Whaley, Lillington, NC (US)

(73) Assignee: Boon Edam, Inc., Lillington, NC (US)

( * ) Notice: Subject to any disclaimer, the term of this patent is extended or adjusted under 35 U.S.C. 154(b) by 92 days.

(21) Appl. No.: 18/599,385

(22) Filed: Mar. 8, 2024

(65) Prior Publication Data

US 2024/0212406 A1 Jun. 27, 2024

Related U.S. Application Data

(63) Continuation of application No. PCT/US2022/076133, filed on Sep. 8, 2022.

(Continued)

(51) Int. Cl.

*E06B 11/08* (2006.01)
*G07C 9/15* (2020.01)
*G07C 9/25* (2020.01)

(52) U.S. Cl.

CPC ............... *G07C 9/15* (2020.01); *G07C 9/257* (2020.01)

(58) Field of Classification Search

CPC ........ G07C 2209/08; G07C 9/15; G07C 9/20; G07C 9/257; G07C 9/37; G07C 9/00;

(Continued)

(56) References Cited

U.S. PATENT DOCUMENTS 7,119,682 B1 10/2006 Fisher
2002/0067259 A1 6/2002 Fufidio et al.

(Continued)

FOREIGN PATENT DOCUMENTS

WO 2023039485 A1 3/2023

OTHER PUBLICATIONS

Shavi, Suchit , "Secured room access module", 2017 International Conference On Smart Technologies For Smart Nation (SmartTechCon), Bengaluru, India, 2017, 1134-1138.

*Primary Examiner* — Dionne Pendleton
(74) *Attorney, Agent, or Firm* — Peacock Law P.C.; Justin R. Muehlmeyer; Daniel J. Berenger-Russell

(57) ABSTRACT

Separation systems, anti-piggybacking devices, computer program products and related methods for controlling access to a restricted area are provided. For example, a method for allowing single authorized entrance through a passage to control entrance into a restricted area of a facility can include, upon receiving an access granted signal, unlocking a lockable turnstile for an entry time period to permit the user to rotate a rotary panel assembly of the turnstile to enter the restricted area. The method can also include sensing, using a piggybacking detection device, a number of users in a count area within the turnstile while the turnstile is unlocked. Further, the method can include resetting the piggybacking detection device and locking the turnstile after only the single user is detected in the counter area and the rotary panel assembly of the turnstile is rotated to a position in the turnstile in which the single user is allowed to enter the restricted area.

14 Claims, 7 Drawing Sheets

Related U.S. Application Data

(60) Provisional application No. 63/241,961, filed on Sep. 8, 2021.

(58) Field of Classification Search
CPC .................. G07C 9/28; G07C 9/00571; G07C 2009/00412; G07C 2009/00634; G07C 9/00309; G07C 9/215; G07C 2009/0092; E06B 11/08; E06B 3/90; E05Y 2400/8505; E05Y 2800/106; E05Y 2900/132; E05G 5/003; E05F 15/608; E05F 15/73; E05F 15/70; E05F 15/76; E05F 2015/765; H02J 1/14; H02J 7/0063; G08B 13/19682; G08B 13/19684; G08B 13/19695; G08B 21/02; G08B 21/185; G08B 25/009; G08B 25/014; G08B 25/12; G08B 25/14; G08B 27/001; G08B 7/06; G06F 21/6218; G05B 15/02; E05B 47/0001; G01V 5/20; E04H 1/00; E04H 1/005; E04H 1/1205; E04H 1/1227; E04H 2001/1283; E04H 3/00; E04H 3/08
See application file for complete search history.

(56) References Cited

U.S. PATENT DOCUMENTS

| | | | | |
|---|---|---|---|---|
| 2005/0249382 | A1 | 11/2005 | Schwab et al. | |
| 2007/0194917 | A1 | 8/2007 | Girod et al. | |
| 2007/0268145 | A1* | 11/2007 | Bazakos | G07C 9/28 340/521 |
| 2008/0244978 | A1* | 10/2008 | Soyugenc | E05F 15/608 49/42 |
| 2016/0281424 | A1 | 9/2016 | Grillberger | |
| 2018/0247070 | A1* | 8/2018 | Evans | G08B 25/12 |
| 2020/0175792 | A1* | 6/2020 | McLeod | E05B 47/0001 |
| 2024/0096152 | A1 | 3/2024 | Measom et al. | |

* cited by examiner

N.O. = NORMALLY OPEN N.C. = NORMALLY CLOSED COM = COMMON N.U. = NOT USED, DON'T CONNECT

| INPUT STATES | ZERO | ONE | TWO | DCL | RESET | TIMEOUT | SAB | COMERR | VALID | OK | NOK | SAB | STA | COMMENT | FUNCTION |
|---|---|---|---|---|---|---|---|---|---|---|---|---|---|---|---|
| | 0 | 0 | 0 | 0 | 0 | 0 | 0 | 0 | 1 | 0 | 0 | | B0 | ALL CLEAR, NO PERSON, NO OBJECT IN RANGE | BADGE READER ACTIVE |
| | X | X | X | 1 | 0 | 0 | 0 | 0 | 1 | 1 | 0 | | B0 | OBJECT IN RANGE, NO PERSON DETECTED | BADGE READER INACTIVE |
| | 0 | 1 | 0 | 1 | 0 | 0 | 0 | 0 | 1 | 1 | 0 | | B0 | ONE PERSON COUNTED AND STILL IN RANGE | BADGE READER INACTIVE |
| | 0 | 0 | 1 | 1 | 0 | 0 | 0 | 0 | 1 | 1 | 1 | | B0 | TWO PERSONS COUNTED AND STILL IN RANGE | BADGE READER INACTIVE, RELOCK DOOR |
| | X | X | X | X | X | X | 1 | 0 | 1 | 1 | 1 | | B3 | SABOTAGE DETECTED BY SENSOR | BADGE READER INACTIVE, RELOCK DOOR |
| | X | X | X | X | X | X | X | 1 | 1 | 1 | 1 | | B2 | COMMUNICATION ERROR | BADGE READER INACTIVE, RELOCK DOOR |
| | | | | | | | | | | | | | | B0: ~1Hz, B2: ~3Hz, B3: ~6Hz | |

FIG. 6

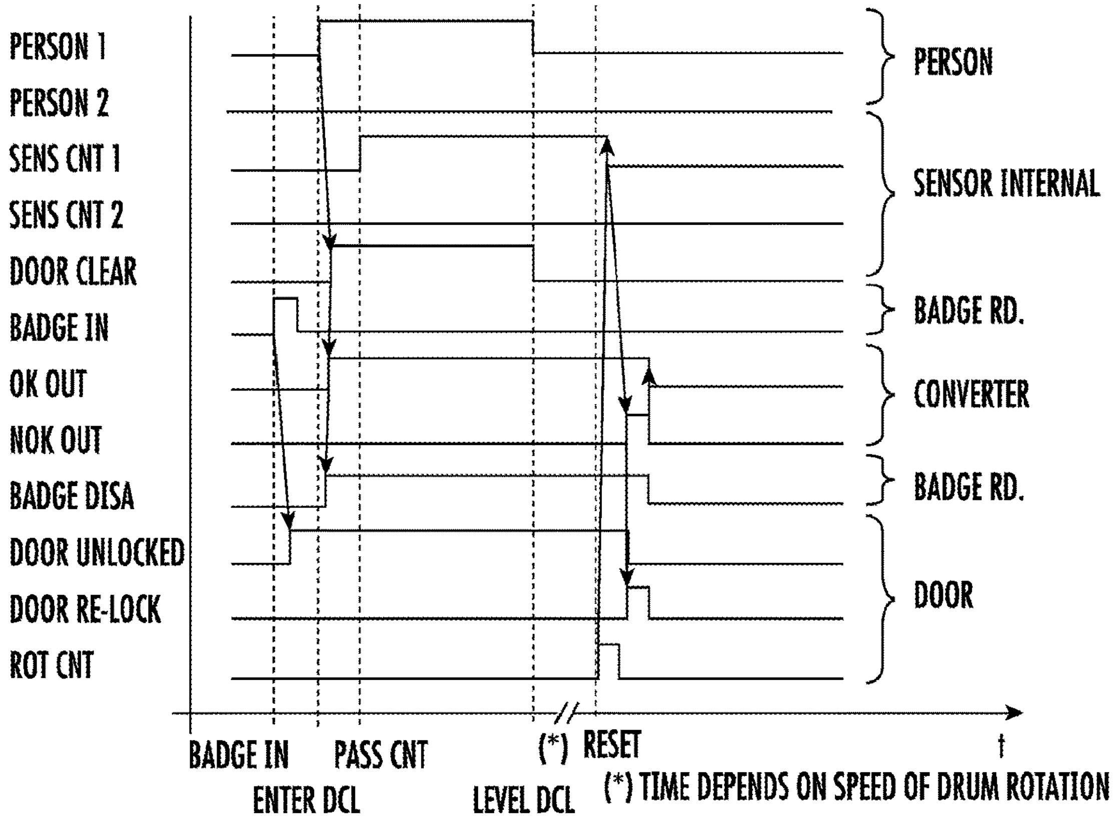

FIG. 7

SEPARATION SYSTEMS, TAILGATING AND PIGGYBACKING DETECTION DEVICES, AND RELATED COMPUTER PROGRAM PRODUCTS FOR CONTROLLING ACCESS TO A RESTRICTED AREA AND RELATED METHODS

CROSS-REFERENCE TO RELATED APPLICATIONS

This application is a continuation of International Application No. PCT/US22/076133, entitled "SEPARATION SYSTEMS, TAILGATING AND PIGGYBACKING DETECTION DEVICES, AND RELATED COMPUTER PROGRAM PRODUCTS FOR CONTROLLING ACCESS TO A RESTRICTED AREA AND RELATED METHODS", filed Sep. 8, 2022, which claims priority to U.S. Provisional Patent Application No. 63/241,961, entitled "SEPARATION SYSTEMS, TAILGATING AND PIGGYBACKING DETECTION DEVICES, AND RELATED COMPUTER PROGRAM PRODUCTS FOR CONTROLLING ACCESS TO A RESTRICTED AREA AND RELATED METHODS", filed Sep. 8, 2021, and the specifications and claims thereof are incorporated herein by reference.

BACKGROUND OF THE INVENTION

Field of the Invention

The present subject matter relates to separation systems, piggybacking detection devices and computer program products for controlling access to a restricted area. In particular, the present subject matter relates to separation systems, anti-piggybacking devices, computer program products and related methods for controlling entry and or exit to ensure only one authorized person enters or exits the control area when credentials for that person is presented at that time.

Background

Security is a rising concern in the world today. From hackers accessing valuable information to intruders threatening the safety of people and property, companies are recognizing the need for better security. Successfully closing the biggest gap in physical security—unauthorized entry—starts with addressing the entrance points around a building. With ever increasing risks in today's climate, security professionals know how critical it is to ensure only authorized users are inside a building at any time. The key to mitigating risk and knowing who is in a building at all times is to implement secure entry solutions throughout. To improve the physical security of buildings and facilities, one of the best options is often the use of turnstiles to control employee and visitor access.

Turnstiles are used at a wide variety of settings, including stadiums, amusement parks, mass transit stations, office lobbies, airports, factories, power plants and other industrial and manufacturing facilities.

From a business standpoint, turnstiles can give an accurate, verifiable count of people entering or exiting a facility. When used in a manufacturing facility, turnstiles can be helpful from a security standpoint. The turnstiles can be designed to let only workers with the correct clearances to enter the facility or a restricted area within the facility, for example at a shift change. Turnstiles often use ratchet mechanisms to allow the rotation of the stile in one direction allowing ingress but preventing rotation in the other direction. In industrial and manufacturing facilities applications, full-height turnstiles are often used, which can commonly be about 7-foot (2.1 m) high and operate similar to a revolving door, eliminating the possibility of someone jumping over the turnstile. However, this type of turnstile functions differently than a revolving door, in that it often does not allow someone to come in as someone else goes out. Full height turnstiles are a rugged, low-maintenance solution for the harshest outdoor conditions, acting as a deterrent against piggybacking and unauthorized entry at a company's fence line. Full height turnstiles can be designed to fit the needs of the environment, whether that be for interior or exterior unmanned monitoring.

Generally, in industrial and manufacturing facilities applications, turnstiles are often designed to operate only after a swiping, tapping, or inserting of a paper ticket or electronically encoded card on or in a card reader. By having workers enter in a single file using a card reader access full height turnstile, for example, enables controlled access to either the facility or the restricted area within the facility to the workers at their appointed shift and can help assure that the right person is entering at the right time and keep tabs on entry and exit. Further, the use of such turnstiles and card reader security system can allow the entrance and exit points where such turnstiles are employed to be monitored remotely as needed.

A problem that still arises with such security systems that employ a card reader access full height turnstile where unauthorized people or personnel can try to gain access to the facility or restricted area by piggybacking a worker who is authorized to enter or piggyback a legitimate authorized entry where more than one person tries to pass through the turnstile on the reading of a single card.

As such, a need exists for improving the security with a facility by allowing only authorized personnel into the facility or a restricted area by allowing only one user to pass through a turnstile at a time.

BRIEF SUMMARY OF THE INVENTION

The present subject matter relates to separation systems and piggybacking detection devices for controlling access to a restricted area. In particular, the present subject matter provides separation systems, piggybacking detection devices, and related methods for controlling entry and or exit to ensure only one authorized person enters or exits the control area when credentials for that person is presented at that time.

The present subject matter also relates to computer program products for controlling access to a facility or restricted area through one or more turnstiles. Aspects of the subject matter described herein may be implemented in software, in combination with hardware and/or firmware. For example, the subject matter described herein may be implemented in software executed by a hardware-enabled processor. In one exemplary implementation, the subject matter described herein of detecting single passage ingress or egress into or out of a facility or restricted area while also detecting piggybacking, piggybacking or related unauthorized entries may be implemented using a non-transitory computer readable medium having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms. Further, it should be noted that the systems and methods utilize and can comprise turnstiles, security interlocks and detection devices used in securing a facility by controlling access to a restricted area by allowing single passage ingress or egress into or out of the area by only authorized personal by preventing piggybacking, piggybacking or related situations from occurring as described herein. These separation systems, turnstiles and detection devices constitute special purpose devices that improve the technological field of providing secure and controlled entry into a facility or restricted area.

While one or more objects of the presently disclosed subject matter having been stated hereinabove, and which is achieved in whole or in part by the presently disclosed subject matter, other objects will become evident as the description proceeds when taken in connection with the accompanying drawings as best described hereinbelow proceeds when taken in connection with the accompanying drawings as best described hereinbelow.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

FIG. 6 illustrates an input/output state diagram of a separation system that identifies when an access control system is active or inactive based on the signals received by a piggybacking detection device by a turnstile controller according to an embodiment of the present invention.

FIG. 7 illustrates a timing chart for a single user entry into a lockable turnstile of a separation system in which a successful passage of a user through the lockable turnstile occurs according to an embodiment of the present invention.

Figure 1:
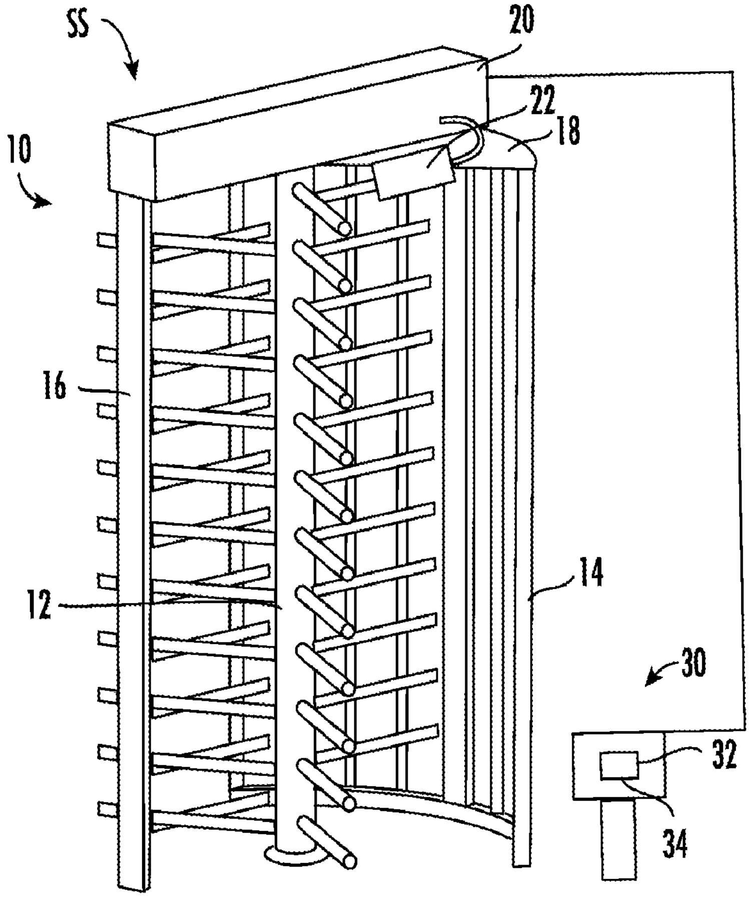
FIG. 1 illustrates a perspective view of a full height turnstile of a separation system according to an embodiment of the present invention.
Figure 2:
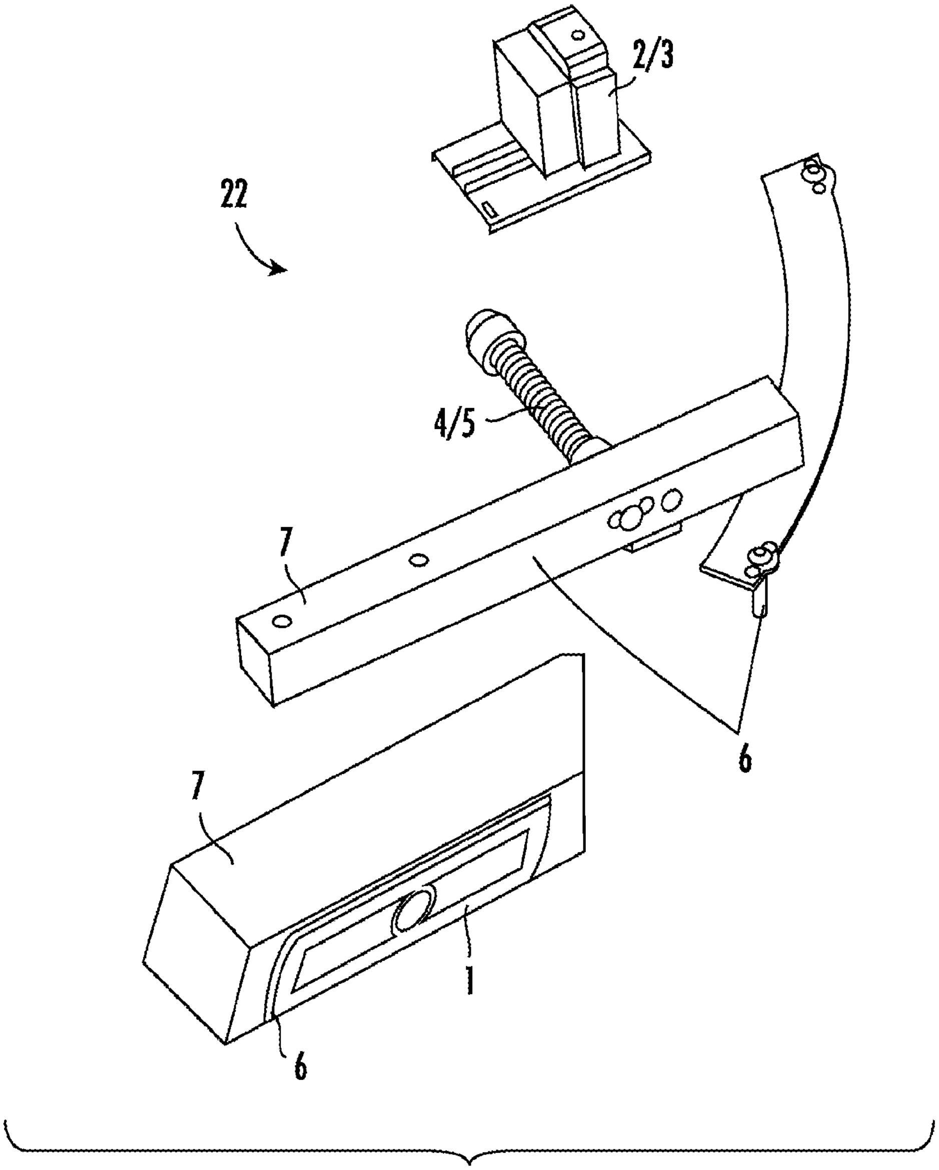
FIG. 2 illustrates a perspective view of components of piggybacking and/or piggybacking detection devices that can be installed on or installed with the full height turnstile according to FIG. 1 in a separation system according to an embodiment of the present invention.

Repeat use of reference characters in the present specification and drawings is intended to represent the seam or analogous features or elements of the present subject matter.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

DETAILED DESCRIPTION OF THE INVENTION

Reference now will be made to the embodiments of the present subject matter, one or more examples of which are set forth below. Each example is provided by way of an explanation of the present subject matter, not as a limitation. In fact, it will be apparent to those skilled in the art that various modifications and variations can be made in the present subject matter without departing from the scope or spirit of the present subject matter. For instance, features illustrated or described as one embodiment can be used on another embodiment to yield still a further embodiment. It is to be understood by one of ordinary skill in the art that the present discussion is a description of exemplary embodiments only and is not intended as limiting the broader aspects of the present subject matter, which broader aspects are embodied in exemplary constructions.

Although the terms first, second, right, left, front, back, top, bottom, etc. may be used herein to describe various features, elements, components, regions, layers and/or sections, these features, elements, components, regions, layers and/or sections should not be limited by these terms. These terms are only used to distinguish one feature, element, component, region, layer, or section from another feature, element, component, region, layer, or section. Thus, a first feature, element, component, region, layer, or section discussed below could be termed a second feature, element, component, region, layer, or section without departing from the teachings of the disclosure herein.

Similarly, when a feature or element is being described in the present disclosure as "on" or "over" another feature or element, it is to be understood that the features or elements can either be directly contacting each other or have another feature or element between them, unless expressly stated to the contrary. Thus, these terms are simply describing the relative position of the features or elements to each other and do not necessarily mean "on top of" since the relative position above or below depends upon the orientation of the device to the viewer.

Embodiments of the subject matter of the disclosure are described herein with reference to schematic illustrations of embodiments that may be idealized. As such, variations from the shapes and/or positions of features, elements, or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted, or simplified to facilitate explanation of the subject matter disclosed herein. Thus, the features, elements or components illustrated in the figures are schematic in nature and their shapes and/or positions are not intended to illustrate the precise configuration of the subject matter and are not necessarily intended to limit the scope of the subject matter disclosed herein unless it specifically stated otherwise herein.

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5, and from about 3.2 to about 6.5.

"Computing device(s)," as used herein means one or more programmable logic controllers (PLC), microcomputers, desktop computers, laptop computers, set-top devices, tablet computers, mobile devices, mobile smart devices, smartphones, servers, other hardware, and/or the like. In some embodiments, the computing device may be provisioned with a hardware-based processor that is configured to execute software programs or applications.

"Software" or "Software application" as used herein means a computer program product for and used on a computing device, which can include, but is not limited to a PLC, microcomputers, desktop computers, laptop computers, set-top devices, tablet computers, mobile devices, mobile smart devices, smartphones, servers, other hardware, and/or the like, that can be in the form of a non-transitory computer readable media comprising computer executable instructions embodied in a computer readable medium that when executed by a processor of a computer or computing device can control. The computer or computing device such that the computer or computing device can perform specific steps.

"Rotary panel assembly" as used herein means a door assembly on a turnstile that comprises a plurality of rotatable panels, such as rotor arms, wings, doors, gate, or the like that extend outward from a revolvable post that rotate as the post rotates to permit passage of a user through the turnstile with the space between adjacent rotatable panels comprising a passage compartment.

"Piggybacking" as used herein means a situation when controlling access through an entry way with a turnstile, having two or more users enter a passage compartment between adjacent rotatable panels for passage through the turnstile.

"Piggybacking detection device" as used herein means a detection device having a sensor thereon that can identify the number of users within a count area within a turnstile passage compartment of a turnstile and can communicate with the turnstile controller to permit or restrict rotation of a rotary panel assembly of the turnstile.

"Entry time period" as used here means a period of time in which a lockable turnstile is unlocked to permit rotation of a rotary panel assembly for passage of one passage compartment through the turnstile once an access signal is received by a turnstile controller of the lockable turnstile before locking the turnstile again. For example, in some embodiments, the entry time period can be between about 3 seconds to about 15 seconds. In some embodiments, the entry time period can be between about 5 seconds to about 10 seconds. In some embodiments, the entry time period can be about 5 seconds. In some embodiments, the entry time period can be about 10 seconds.

"Turnstile controller" as used herein means a controller that comprises a computing device that receives information, such as signals, to control the locking and unlocking of a lockable turnstile to prevent rotation of a rotary panel assembly of the turnstile. In some embodiments, the turnstile controller can also comprise electro-mechanical components that physically lock the turnstile to prevent rotation of the rotary panel assembly of the turnstile.

"Access control system" as used herein means a device, devices, or a system used to identify a user as either an authorized user or an unauthorized user for entry into a restricted area. To identify the user, the access control system can comprise one or more of a variety of different identification devices. For example, the access control system can include, but is not limited to a badge reader, a card reader, a keypad, or a biometric identification device, such as fingerprint recognition, hand recognition, face recognition, or the like.

"Detection area" as used herein means the zone or area where the user is preparing to enter into the turnstile and preparing to present their credentials to an access control system.

"Count area" as used herein means the zone or area within a space of a turnstile where an open passage compartment is presented and resides such the user enters the passage compartment for passing through the turnstile.

The present subject matter relates to separation systems that are structural measures for access control to a restricted area. People are checked for their authorization and individually granted or revoked access. The separation systems disclosed herein use an anti-piggybacking sensor that is designed as a person recognition system for security interlocks. Sensor interlock systems ensure that only one single, authorized person is allowed access to the secured area. The situations, such as two people entering a turnstile, are safely detected by the system via artificial intelligence (AI) functions.

As disclosed herein, a separation system is provided for allowing single authorized entrance through a passage to control entrance into a restricted area of a facility. The separation system can comprise a lockable turnstile having a rotary panel assembly that rotates to permit the passing of a user through an entry way when authorized. The separation system can also comprise a turnstile controller coupled to the lockable turnstile to control the rotation of the rotary panel assembly to permit passage of a user through the lockable turnstile. Further, the separation system can comprise a piggybacking detection device in operable communication with the turnstile controller. The piggybacking detection device is configured to provide instructions to the turnstile controller to control the rotation of the rotary panel assembly to permit passage of a user through the lockable turnstile. The piggybacking detection device can comprise a sensor that can be configured for detecting the presence of one or more users within a count area in the turnstile before the entry way and positioned relative to the turnstile for detecting the presence of one or more users within a count area in the turnstile. In particular, the piggybacking detection device can be configured to receive a signal from the sensor regarding the presence of one or more users, such that different signals, or instructions, can be generated to lock and unlock the lockable turnstile at different times depending on what the sensor detects.

For example, if a single authorized user is detected in the count area by the sensor, the piggybacking detection device can be configured to send a signal, or instructions, to the turnstile controller to permit rotation of the rotary panel assembly for a specified time period while the user is present in the count area. Additionally, if two or more users are detected in the count area by the sensor, the piggybacking detection device is configured to send a signal to restrict rotation of the rotary panel assembly. If a single unauthorized user is presented and detected in the count area by the sensor, the piggybacking detection device can be configured to send a signal, or instructions, to restrict rotation of the rotary panel assembly. Further, if a single authorized user is presented and is not detected in the count area by the sensor, the piggybacking device can be configured to send a signal, or instructions, to restrict rotation of the rotary panel assembly.

In some embodiments, the piggybacking detection device can comprise a converter box and a power supply. The sensor, the converter box, and the power supply can all be in operable communication such that the power supply provides power to the sensor and the converter box, and the converter box receives data, such as digital data, from the sensor. The converter box can be configured to convert the digital data to an analog signal to control the rotation of the rotary panel assembly of the lockable turnstile. The converter box can be in communication with the turnstile controller to provide, signals, information, or instructions to the turnstile based on the information generated by the piggybacking detection device.

In some embodiments, the separation system can comprise an access control system in operable communication with the turnstile controller and the piggybacking detection device. The access control system can be configured to identify a user as either an authorized user or an unauthorized user and send a signal to at least one of the turnstile controller or the piggybacking detection device that identifies a user present in front of the turnstile as authorized or unauthorized. To identify the user, the access control system can comprise one or more of a variety of different identification devices. For example, in some embodiments, the access control system can comprise at least one of a badge or card reader, keypad, or a biometric identification device, such as fingerprint recognition, hand recognition, face recognition, or the like.

As shown in FIG. 1, an embodiment of a separation system SS is provided. The separation system SS can comprise an embodiment of a full height turnstile 10. The turnstile 10 can comprise a variety of different turnstile embodiments and different combinations of turnstile components. The turnstile 10 can comprise a rotary panel assembly 12 having equally spaced panels extending radially outward from a central rotatable post with each of the panels being vertically oriented. The rotatable panels can comprise a variety of different configurations, such as rotor arms, wings, doors, gate, or the like that extend outward from a revolvable post. For example, in the embodiment shown, the turnstile 10 can comprise a rotor arm assembly 12 having equally spaced rotor arms extending radially outward in horizontal direction from a central rotatable post in sets of rotor arms with each set of rotor arms being in a vertical line. The from a central rotatable post at three equally spaced locations such that the vertical lines of rotor arms are about 120° from each other. The rotor arm assembly 12 can be configured to rotate in a single direction, for example, counterclockwise for an entry through the turnstile 10 as shown in FIG. 1.

The turnstile 10 can comprise a shield 14 having a curved wall with the shield 14 being positioned on one side of the rotor arm assembly 12 such that the rotor arms pass within close proximity of the curved wall of the shield 14 that prevent a person from passing between the ends of the rotor arms and the shield 14. The shield 14 can comprise different embodiments. For example, in some embodiments, the shield 14 can comprise vertical spaced metal bars, horizontal spaced metal bars, a curved metal sheet, a curved polymer sheet, such as a plexiglass sheet, or the like.

In some embodiments, the turnstile 10 can also comprise a barrier assembly 16 that can be positioned on a side of the rotor arm assembly 12 opposite the shield 14. The barrier assembly can comprise a variety of different embodiments. In some embodiments, for example, the barrier assembly 16 can be stationary have barrier arms that extend radially outward in horizontal direction from a barrier post with the barrier arms being in a vertical line. The barrier arms of the barrier assembly 16 can be offset from the rotor arms of the rotor assembly 12 and the barrier assembly 16 can be positioned relative to the rotor assembly 12 such that the ends of the barrier arms of barrier assembly 16 are within close proximity of the central post of the rotor arm assembly 12 with the rotor arms of the rotor arm assembly 12 being rotatable above and/or below the offset barrier arms of the barrier assembly 16. The turnstile 10 can also comprise a ceiling plate 18 that resides on top of the turnstile 10 between the central post of the rotor arm assembly 12 and the shield 14 to prevent people entering the turnstile 10 from crawling through the top. The ceiling plate 18 can be a variety of different embodiments. For example, in some embodiments, the ceiling plate 18 can extend over a partial portion of a top of the turnstile 10. In some embodiments, the ceiling plate 18 can be a full ceiling plate that can extend fully over the top of the turnstile 10. For the ceiling plates 18 that are full ceiling plates, each of the ceiling plates can have a sensor aperture therein to permit the sensor to view a detection area within the turnstile 10, if the ceiling plate does not comprise a material that is transparent, such as a plexiglass or other clear polymer material. Similarly, for the ceiling plates 18 that are partial ceiling plates, each of the ceiling plates can have a sensor aperture therein to permit the sensor to view a detection area within the turnstile 10 or the sensor can reside in apposition where the partial ceiling plate does not extend. Further, the turnstile 10 can comprise a turnstile controller 20 that controls of the turnstile 10 and resides within the top channel assembly housing that can reside on top of the ceiling plate 18 and can house the controls for the turnstile 10.

The separation system SS can also comprise a piggybacking detection device 22 in operable communication with the turnstile controller. The piggybacking detection 22 device can be configured to provide instructions to the turnstile controller 20 to control the rotation of the rotary panel assembly 12 to permit passage of a user through the lockable turnstile 10. Additionally, the separation system SS can comprise an access control system 30 in operable communication with the turnstile controller 20 and/or the piggybacking detection device 22. The access control system 30 can be configured to identify a user as either an authorized user or an unauthorized user and send a signal, or instructions, to at least one of the turnstile controller 20 or the piggybacking detection device 22 that identifies a user present in front of the turnstile 10 as authorized or unauthorized. To identify the user, the access control system 30 can comprise one or more of a variety of different identification devices 32. For example, in some embodiments, the access control system can comprise an identification device 32 that comprises at least one badge reader 34. In some embodiments, the access control system can comprise an identification device 32 that comprises at least one biometric identification device.

Referring to FIGS. 2, 3A, 3B and 9, the components of a piggybacking detection device, generally designated 22 is provided. The detection device 22 can comprise a sensor 1 for detecting the presence of users within a count area in the turnstile 10. The detection device 22 can comprise a converter box 2 that when installed is in digital communication with the sensor 1 and can provide analog outputs of activity and a power supply 3 that supplies appropriate power to the converter box 2 and the sensor 1. The sensor 1, the converter box 2, and the power supply 3 can be installed in a housing 7 of a mount 6 that include a box that can house components such as the sensor 1 and include an attachment plate for secure the mount 6 and the detection device 22 to the turnstile 10. The detection device 22 can further comprise a sensor cable 4 to provide digital communication related to the sensor 1 and a controller cable kit 5 that provides analog communication between the converter box 2 and the controls of the turnstile 10 in the top channel assembly 20. While the sensor cable 4 and controller cable kit 5 shown extending from a side of the housing 7 of the mount 6, the sensor cable 4 and controller cable kit 5 can be configured to run out a front or rear end of the housing 7 of the mount 6.

Figure 8:
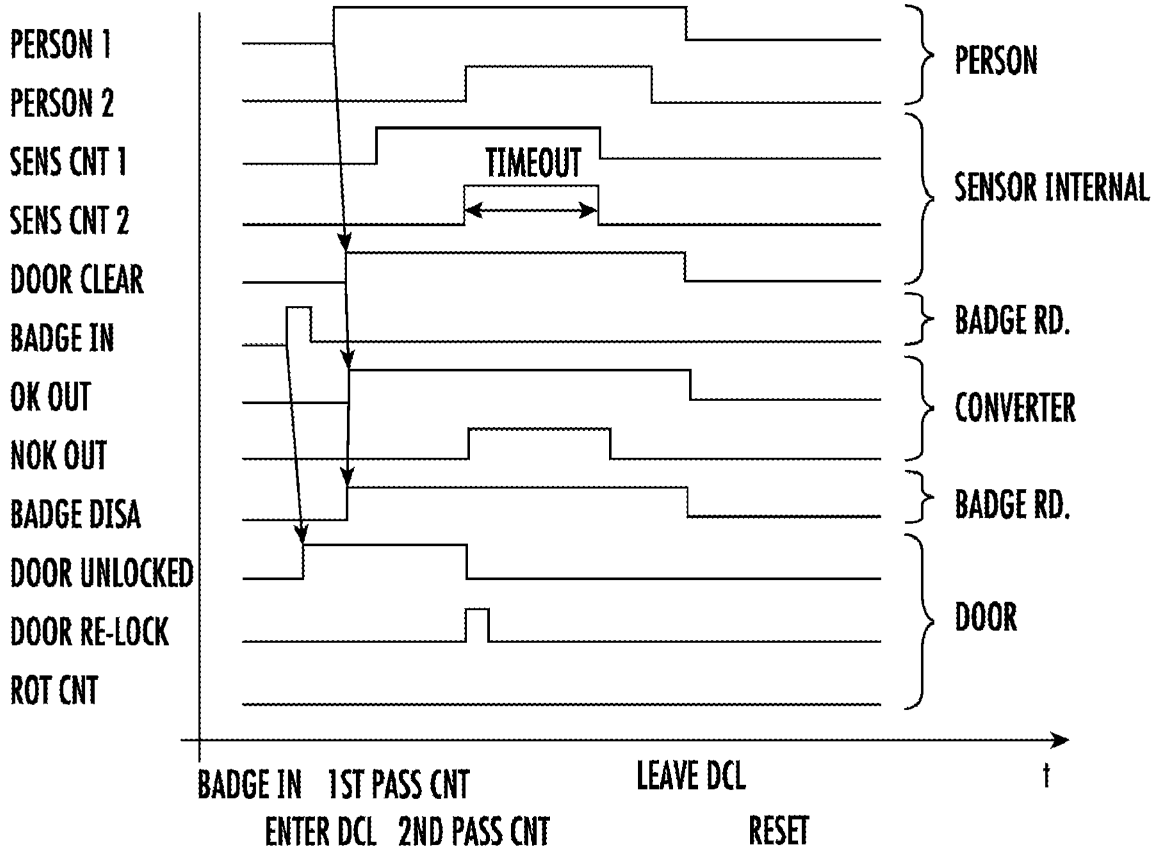
FIG. 8 illustrates a timing chart where two users enter into a lockable turnstile of a separation system in which the turnstile is locked and passage of the users through the lockable turnstile fails according to an embodiment of the present invention.

Additionally, as shown in FIG. 8, in some embodiments, the piggybacking detection device 22, the turnstile controller 20 and/or the access control system 30 can be considered or may comprise computing devices as defined herein. For example, the piggybacking detection device 22 can comprise the sensor 1, the converter box 2, power supply 3, one or more processors 24, and a memory 26 (e.g., one or more hardware components for storing executable instructions, data, and/or the like) in which a software application in the form of instructions 28 can be stored that can be executed by the one or more processors 24. When executed by processor (s) 24, instructions 28 may cause piggybacking detection device 22 to perform one or more operations, functions, and/or the like described herein. Additionally, the turnstile controller 20 and/or the access control system 30 may also include one or more processors and a memory such that portions the software applications described herein can be performed by the piggybacking detection device 22, the turnstile controller 20 and/or the access control system 30. When executed by processor(s), such instructions may cause piggybacking detection device 22, the turnstile controller 20 and/or the access control system 30 to perform one or more operations, functions, and/or the like described herein.

Figure 3A:
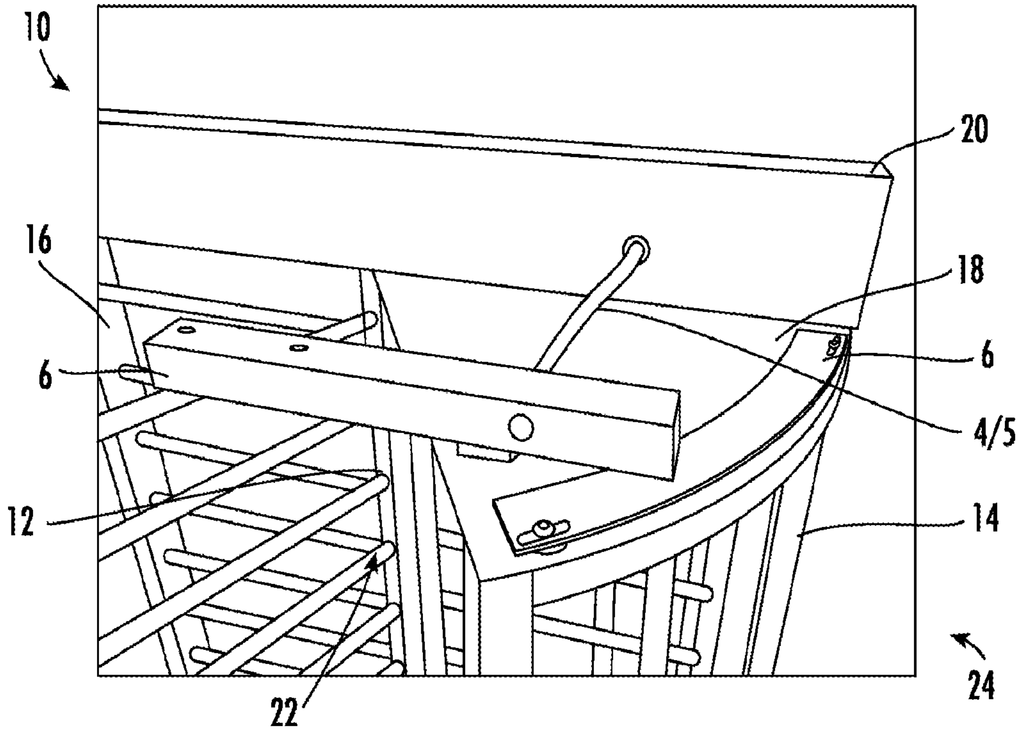
FIGS. 3A and 3B illustrate different perspective views of a separation system, including a turnstile and detection device, according to an embodiment of the present invention.
Figure 3B:
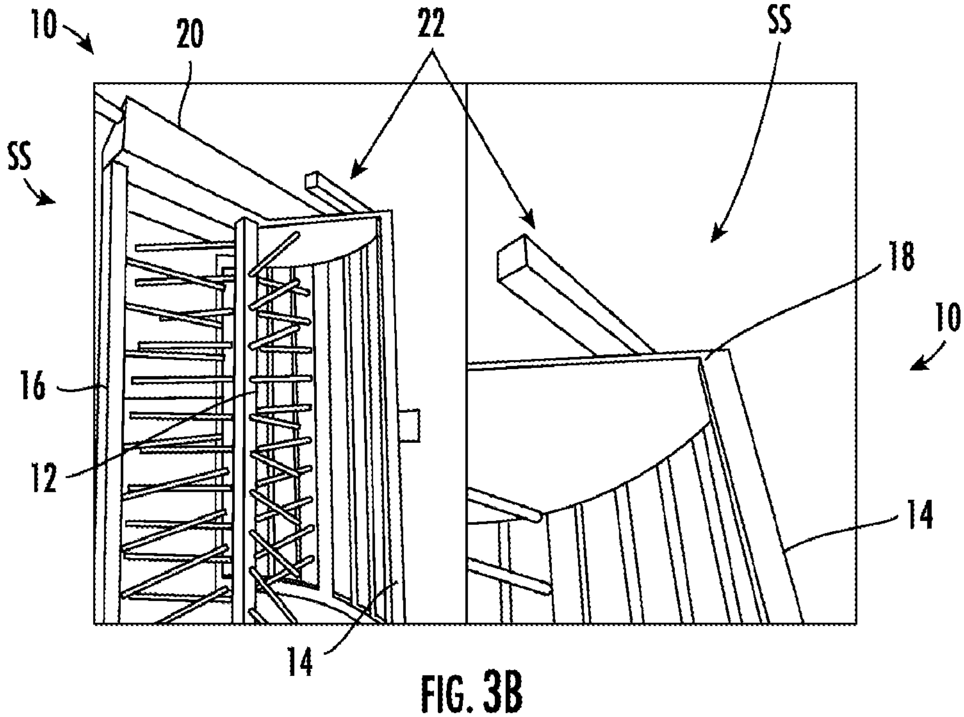

The piggybacking detection device 22 can be installed on the turnstile 10 to form the separation system SS as shown in FIGS. 3A and 3B. For example, the mount 6 of the detection device 22 can be secured to the ceiling plate 18 and shield 14 with the attachment plate of the mount 6 such that the sensor 1 is directed to a count area between the rotor arms of the rotor arm assembly 12 and the shield 14. the sensor is mounted transversely to the direction of movement. The sensor(s) 1 can be installed on a horizontal surface. The maximum horizontal tilt tolerance can be about ±5°. If the upper door panel does not permit direct mounting, the required horizontal position of the sensor can be achieved by means of suitable sensor brackets. The sensor cable 4 and controller cable kit 5 can be connected to the top channel assembly 20 to connect the sensor 1 and converter box 2 of the detection device 22 with the turnstile controller 20 that controls of the turnstile 10 and resides within the top channel assembly housing. In this manner, signals from the detection device 22 can be processed to control access through the turnstile 10.

In particular, in some embodiments, the anti-piggybacking sensor 1 can operate according to the Time-of-Flight measurement principle (TOF) combined with artificial intelligence (AI) algorithms that continuously learn traffic and object patterns. The detection device 22 can determine distance information within the detection resolution of 500 pixels. From these individual distances, a sequence of images (3D image streaming) can be evaluated in the sensor 1, which as a result distinguishes three states: detection area and or counter area free; one person passes the detection area and/or counter area; more than one person passes the detection area and/or the counter area. The sensor data can be sent as a data stream via wired communications such as, for example, by Ethernet, or wireless communication to the converter box 2. The status display indicates the operational readiness of the sensor 2. The converter box 2 receives the sensor's data stream via an Ethernet connection, evaluates them and generates binary switching signals which control the outputs and the LEDs status.

Figure 5:
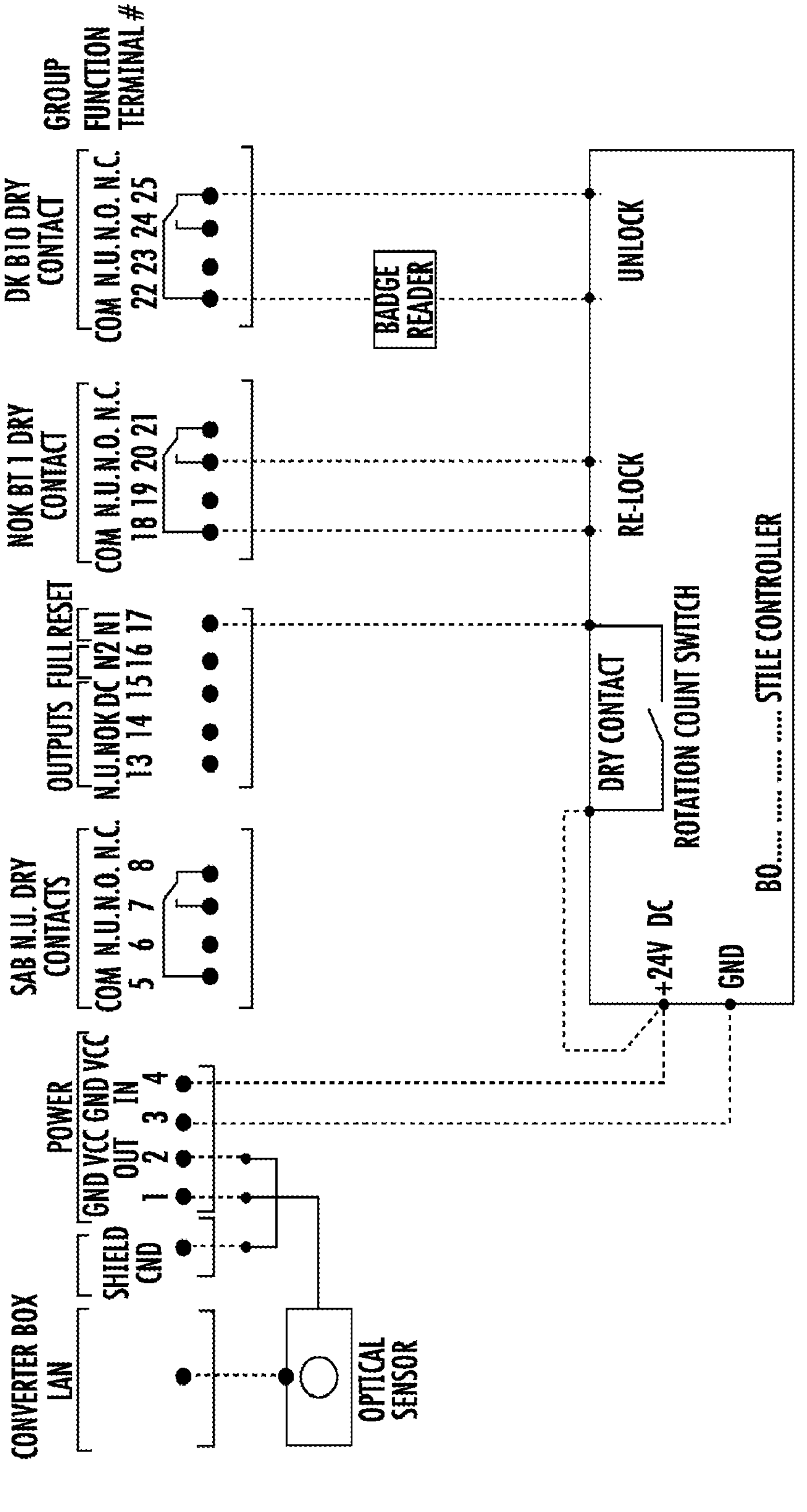
FIG. 5 illustrates a schematic of a turnstile controller of a separation system according to an embodiment of the present invention.

Referring to FIG. 5, the turnstile controller 20 can be in operable communication with the piggybacking detection device 22 and/or the access control system 30 to activate the locking and unlocking of the lockable turnstile 10. For example, in some embodiments, the converter box 2 can be connected to the turnstile controller 20 of the turnstile 10 through three analog signals. The first signal is "Access Granted" signal which can temporarily interrupt an access control signal from the access control system 30 to the turnstile 10. This access control signal is used to prevent access in the event of unauthorized activity. By interrupting the access control signal, the turnstile 10 is unlocked to permit rotation of the rotor arm assembly allowing the authorized user to pass through the turnstile 10. The connection points for generating and sending these signals can be an Access Granted terminal and the Access Granted wire from an access control system. A second signal is "Re-Lock" signal which can be connected through a Reset and Rotation Detection switch in the turnstile controller 20 of the turnstile 10. This Re-Lock signal is used to relock the turnstile 10 in the event of unauthorized passage as shown in FIG. 6. The connection points for generating and sending these signals can be pin 1 of a reset switch plug in the turnstile controller 20 of the turnstile 10 and an electrical connection of a rotation detection switch in the turnstile controller 20 in the turnstile 10 also as shown in FIG. 6. A third signal is "Reset" signal which can be connected through the rotation detection switch in the turnstile controller 20 of the turnstile 10. The Reset signal is used to inform the piggybacking detection device 22 that the turnstile 10 has been rotated so all data can be reset for a next passage. In some embodiments as shown in FIG. 6, the connection points for generating and sending these signals can be one leg of rotation detection switch in the controls in the turnstile 10 and a 24 VDC.

Figure 4:
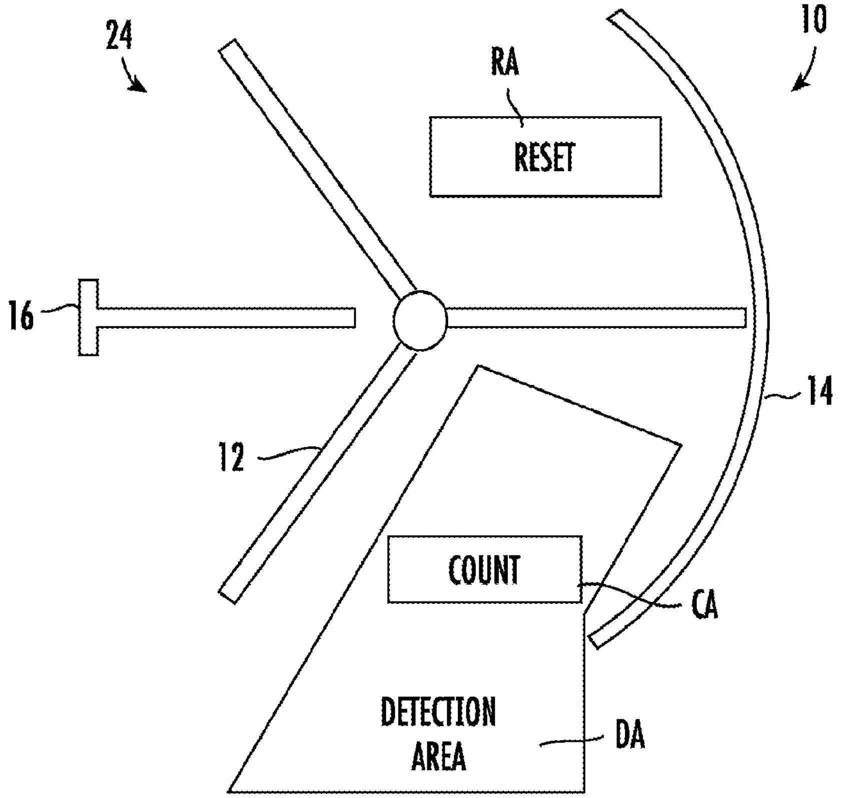
FIG. 4 illustrates a schematic top plan view of a separation system in use according to an embodiment of the present invention.

Referring to FIGS. 4-6, one or more software applications can be provided to perform the process of permitting only one user to pass through the turnstile 10 at a time. The following are some example steps carried out by such a software application that can be used within the system SS. For a standard passage of a worker or user the following can happen. When a single user approaches the turnstile 10, the single user is detected by the sensor 1 of the detection device 22 in the detection area DA. Upon detection, an OK relay of the converter box 2 is activated allowing an "Access Granted" signal to be received from the access control system upon presentation of a valid card causing the turnstile 10 to unlock for passage. As the user passes into the count area CA, the count is increased to one (1). The user and the rotor arms of the rotor assembly 12 the user is pushing continue through the turnstile 10 to the "Reset" area RA where the Reset signal is sent from the controls in the turnstile 10 to the converter box 2 to reset and clear the system completing the passage.

The detection device 22 can also identify when a "walk away" occurs. This occurs when a user approaches turnstile 10 and enters detection area DA. The OK relay is activated allowing the user to receive "Access Granted" upon presentation of valid credential. Access is granted and the turnstile 10 is unlocked. When user leaves detection area DA, N-OK relay is activated relocking the turnstile 10. The detection device 22 and separation system 24 can then be reset and will be ready for next card presentation and passage.

Figure 9:
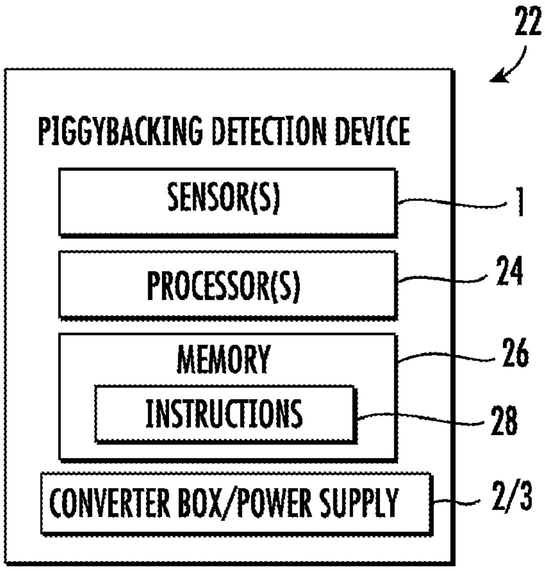
FIG. 9 illustrates a schematic of a piggybacking detection device that illustrates certain components of the piggybacking detection device according to an embodiment of the present invention.

Thus, a separation system SS for allowing single authorized entrance through a passage to control entrance into a restricted area of a facility is provided. The separation system SS can comprise a lockable turnstile 10 having a rotary panel assembly 12 that rotates to permit the passing of a user through an entry way when authorized. The separation system SS can comprise a turnstile controller 20 coupled to the lockable turnstile 10 to control the rotation of the rotary panel assembly 12 to permit passage of a user through the lockable turnstile 10. The separation system SS can comprise a piggybacking detection device in operable communication with the turnstile controller 20 such that the piggybacking detection device 22 provides instructions to turnstile controller 20 to control the rotation of the rotary panel assembly 12 to permit passage of a user through the lockable turnstile 10, the piggybacking detection device 22 comprising a sensor 1 configured and positioned for detecting the presence of one or more users within a detection area DA and or the counter area CA in the turnstile 10 before the entry way. The piggybacking detection device 22, as shown in FIG. 9, can also comprise one or more processors 24 configured to receive a signal from the sensor 1 regarding the presence of one or more users, and a memory 26 for storing data, including instructions 28 that when executed by the one or more processors 24 cause the separation system SS to perform operations. FIG. 6 identifies different scenarios when the access control system 30 and the badger reader 34 are active or rendered inactive based on readings from the piggybacking detection device 22 and/or the turnstile controller 20.

Referring to FIGS. 7 and 8, these operations can comprise steps that occur when a successful access is conducted and an illustration of when a filed access attempt is conducted. These operations represent steps that can be at least partially carried out by one or more software applications and the turnstile. Referring to FIG. 7, a successful access attempt can include, upon receiving an access granted signal, unlocking a turnstile for an entry time period to permit the user to rotate a rotary panel assembly 12 of the turnstile 10 to enter the restricted area. The operations can then include sensing a number of users in a count area within the turnstile while the turnstile 10 is unlocked. The access granted signal can be received from the access control system 30. For example, the badger reader 34 can accepted a badge of the user to permit unlocking of the turnstile 10. In some embodiments, the operations can further comprise sensing, using a sensor in the piggybacking detection device 22, a presence of a single user within a detection area DA of a turnstile 10 before the piggybacking detection device 22 sends a signal, or instructions, to permit the access granted signal to be received and/or acted upon by the turnstile controller 20 to unlock the turnstile 10. As shown in FIG. 8, if the sensor 1 of the piggybacking detection device 22 only senses a single person with the counter area CA as the rotary panel assembly 12 is rotated by the user or otherwise, then the authorized user can pass through the turnstile 10 into the restricted area as long as the user does it within the entry time period. The entry time period can be set by the manufacturer or the owner/end user of the separation system and can be based on the amount of time needed for a user to pass through the turnstile 10 while minimizing the opportunity to allow other users to piggyback in by trying to hide from the sensor 1 of the piggybacking detection device 22. For example, in some embodiments, the entry time period can be between about 3 seconds to about 15 seconds. In some embodiments, the entry time period can be between about 5 seconds to about 10 seconds. In some embodiments, the entry time period can be about 5 seconds. In some embodiments, the entry time period can be about 10 seconds.

Still referring to FIG. 7, the operations can comprise resetting the piggybacking detection device and locking the turnstile after only the single user is detected in the counter area and the rotor arm assembly of the turnstile is rotated to a reset position in the turnstile in which the single user is allowed to enter the restricted area. Once the rotary panel assembly 12 has properly rotated, the turnstile controller 20 can generate a rotary count indicating that a passage compartment within the rotary panel assembly 12 has rotated through the turnstile 10. The rotary count can be used to lock the turnstile 10 and reset piggybacking detection device 22. The resetting can occur once the rotary panel assembly 12 of the turnstile 10 rotates to a reset position in which the rotary count has occurred. In this manner the successful passage of a use through the separation system can occur.

Unsuccessful attempts, however, can occur in different ways. For example, in some embodiments, the operations further comprise locking the turnstile 10 to prevent rotation of the rotary panel assembly 12 of the turnstile 10 and prevent passage into the restricted area if more than one user is detected in the count area CA as shown in FIG. 8. As shown in FIG. 8, upon recognition of a second person entering the count area CA, the turnstile 10 is re-locked to prevent passage through the turnstile 10 into the restricted area. In other scenarios, the operations can include preventing reception of an access granted signal by the turnstile controller 20 using the piggybacking detection device 22 if two or more users are detected in the detection area DA to prevent the unlocking of the turnstile as shown in FIG. 6. Similarly, the operations can include preventing reception of an access granted signal by the turnstile controller 20 using the piggybacking detection device 22 if no users are detected in the detection area DA to prevent the unlocking of the turnstile. Additionally, in some embodiments, the operations can include, upon receiving the access granted signal and sensing the user leaving the detection area DA and not entering the count area CA, locking the turnstile 10 to prevent rotation of the rotary panel assembly 12 of the turnstile 10 and prevent passage into the restricted area. The piggybacking detection device 22 can then be reset. Referring back to FIG. 8, the operations can include, upon receiving the access granted signal and sensing more than one user within the count area CA, locking the turnstile to prevent rotation of the rotary panel assembly 12 of the turnstile 10 and prevent passage into the restricted area. In some embodiments, the operations of the separation system SS can include locking the turnstile 10 to prevent rotation of the rotary panel assembly 12 of the turnstile 10 and prevent passage into the restricted area if the entry time period expires before the rotary panel assembly 12 of the turnstile 10 are rotated to a position that permits access of the single user to restricted area.

In some embodiments that include both a count area and detection area, the detection area DA and the count area CA can overlap as shown in FIG. 4. In some embodiments, the count area CA can cover an area within the turnstile 10 that prevents a user to enter into the turnstile 10 and not be detected by the sensor 1 of the piggybacking detection device 22 during the entry time period.

The detection device 22 can also identify when a piggybacking occurs. Piggybacking occurs when a single user approaches the turnstile 10 for a "standard passage." As the first user begins to pass a second user attempts to pass through with the first user in the same compartment. As the first user passes into the count area CA, the count is raised to one (1). As the second person enters the count area CA, the count is increased to two (2) and the N-OK relay of the converter box is activated triggering the Rese/Re-Lock of the turnstile 10. The turnstile 10 is then relocked and both users are blocked after approximately 20 degrees of rotation of the turnstile 10. Both users can exit the turnstile 10 and the detection area DA in the same direction as they entered. The detection device 22 and separation system 24 can then be reset and will be ready for next card presentation and passage.

Thus, as provided herein, one or more software applications in the form of one or more non-transitory computer-readable media comprising instructions that when executed by one or more computing devices cause the one or more computing devices to perform operations are provided. The one or more software applications can comprise the operations of, upon receiving an access granted signal, generating a signal to unlock a turnstile for an entry time period to perm it the user to rotate a rotary panel assembly of the turnstile to enter the restricted area. The operations can comprise determining a number of users in a count area based on data received from a piggybacking detection device within the turnstile while the turnstile is unlocked. Further, the operations can comprise resetting the piggybacking detection device and generating a signal to lock the turnstile after receiving a signal that the rotary panel assembly of the turnstile is rotated to a position in the turnstile in which the single user is allowed to enter the restricted area. In some embodiments, the operations can comprise generating a signal to accept an access granted signal in a turnstile controller upon receiving a signal from sensor in the piggybacking detection device of a presence of a single user within a detection area of a turnstile. In some embodiments, the operations can comprise sending a signal to lock the turnstile to prevent rotation of the rotor arm assembly of the turnstile and prevent passage into the restricted area if a signal is received from the sensor of the piggyback detection device indicating more than one user are detected in the count area.

In some embodiments, the operations of one or more software applications can comprise generating and sending a signal to prevent reception of an access granted signal by the piggybacking detection device if two or more users are detected in the detection area to prevent the unlocking of the turnstile. In some embodiments, the operations can comprise generating and sending a signal to prevent reception of an access granted signal by the piggybacking detection device if no users are detected in the detection area to prevent the unlocking of the turnstile. In some embodiments, the operations can comprise, upon receiving a signal from the sensor of the piggybacking detection device that the user left the detection area and did not enter the count area, generating and sending a signal to lock the turnstile to prevent rotation of the rotor arm assembly of the turnstile and prevent passage into the restricted area and resetting the piggybacking detection device. In some embodiments, the operations can comprise, upon receiving a signal from the sensor of the piggybacking detection device that more than one user within the count area, generating and sending a signal to lock the turnstile to prevent rotation of the rotor arm assembly of the turnstile and prevent passage into the restricted area.

In some embodiments, the operations of one or more software applications can comprise generating and sending a signal to lock the turnstile to prevent rotation of the rotor arm assembly of the turnstile and prevent passage into the restricted area if the entry time period expires before the rotor arm assembly of the turnstile are rotated to a position that permits access of the single user to restricted area, and then resetting the piggybacking detection device. In some embodiments, the operations can comprise generating and sending a signal to lock the turnstile to prevent rotation of the rotor arm assembly of the turnstile and prevent passage into the restricted area if the entry time period expires before the single user enters the counter area and then resetting the piggybacking detection device. Further, in some embodiments, the operations can comprise, upon receiving notice that a rotary count occurred, resetting the piggybacking detection device.

Thus, as described above, separation systems, anti-piggybacking devices and computer program products for controlling access to a restricted area and methods of using the systems and related devices are disclosed.

These and other modifications and variations to the present subject matter may be practiced by those of ordinary skill in the art, without departing from the spirit and scope of the present subject matter, which is more particularly set forth herein above and any appending claims. In addition, it should be understood the aspects of the various embodiments may be interchanged either in whole or in part. Furthermore, those of ordinary skill in the art will appreciate that the foregoing description is by way of example only, and is not intended to limit the present subject matter.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another. The terms, "a", "an", "the", and "said" mean "one or more" unless context explicitly dictates otherwise.

What is claimed is:

1. A separation system for allowing single authorized entrance through a passage to control entrance into a restricted area of a facility, the separation system comprising:

a. a lockable turnstile comprising a rotary panel assembly that rotates to permit the passing of a user through an entry way when authorized;

b. a turnstile controller coupled to the lockable turnstile to control the rotation of the rotary panel assembly to permit passage of a user through the lockable turnstile;

c. a piggybacking detection device in operable communication with the turnstile controller such that the piggybacking detection device provides instructions to the turnstile controller to control the rotation of the rotary panel assembly to permit passage of a user through the lockable turnstile, d. the piggybacking detection device comprising a sensor configured and positioned for detecting the presence of one or more users within a counter area in the lockable turnstile before the entry way, e. one or more processors configured to receive a signal from the sensor regarding the presence of one or more users, and f. memory storing instructions that when executed by the one or more processors cause the system to perform operations comprising:

i. upon receiving an access granted signal, unlocking the lockable turnstile for an entry time period to permit the user to rotate a rotary panel assembly of the lockable turnstile to enter the restricted area;

ii. sensing a number of users in a count area within the lockable turnstile while the lockable turnstile is unlocked;

iii. resetting the piggybacking detection device and locking the lockable turnstile after only the single user is detected in the counter area and the rotary panel assembly of the lockable turnstile is rotated to a position in the lockable turnstile in which the single user is allowed to enter the restricted area;

iv. sensing, using a sensor in the piggybacking detection device, a presence of a single user within a detection area of the lockable turnstile; and v. upon receiving the access granted signal and sensing the user leaving the detection area and not entering the count area, locking the lockable turnstile to prevent rotation of the rotary panel assembly of the lockable turnstile and prevent passage into the restricted area and resetting the piggybacking detection device.

2. The separation system according to claim 1, wherein the operations further comprise locking the lockable turnstile to prevent rotation of the rotary panel assembly of the lockable turnstile and prevent passage into the restricted area, if more than one user is detected in the count area.

3. The separation system according to claim 1, wherein the operations further comprise preventing reception of an access granted signal by the turnstile controller using the piggybacking detection device if two or more users are detected in the detection area to prevent the unlocking of the lockable turnstile.

4. The separation system according to claim 1, wherein the operations further comprise preventing reception of an access granted signal by the turnstile controller using the piggybacking detection device if no users are detected in the detection area to prevent the unlocking of the lockable turnstile.

5. The separation system according to claim 1, wherein the operations further comprise locking the lockable turnstile to prevent rotation of the rotary panel assembly of the lockable turnstile and prevent passage into the restricted area, upon receiving the access granted signal and sensing more than one user within the count area.

6. The separation system according to claim 1, wherein the operations further comprise: locking the lockable turnstile to prevent rotation of the rotary panel assembly of the lockable turnstile and prevent passage into the restricted area if the entry time period expires before the rotary panel assembly of the lockable turnstile are rotated to a position that permits access of the single user to restricted area; and resetting the piggybacking detection device.

7. The separation system according to claim 1, wherein the operations further comprise: locking the lockable turnstile to prevent rotation of the rotary panel assembly of the lockable turnstile and prevent passage into the restricted area if the entry time period expires before the single user enters the counter area; and resetting the piggybacking detection device.

8. The separation system according to claim 1, wherein the detection area and the count area overlap.

9. The separation system according to claim 1, wherein the count area covers an area within the lockable turnstile that prevents a user to enter into the lockable turnstile and not be detected by the sensor of the piggybacking detection device during the entry time period.

10. The separation system according to claim 1, further comprising the step of resetting once the rotary panel assembly of the lockable turnstile rotates to a position in which a rotary count occurs.

11. A separation system according to claim 1, wherein the piggybacking detection device is configured to receive a signal from the sensor regarding the presence of one or more users, such that:

a. if a single authorized user is detected in the count area, the piggybacking detection device is configured to send a signal to the turnstile controller to permit rotation of the rotary panel assembly for a specified time period while the user is present in the count area;

b. if two or more users are detected in the count area, the piggybacking detection device is configured to send a signal to restrict rotation of the rotary panel assembly;

c. if a single unauthorized user is presented and detected in the count area the piggybacking detection device is configured to send a signal to restrict rotation of the rotary panel assembly; and d. if a single authorized user is presented and is not detected in the count area, the piggybacking detection device is configured to send a signal to restrict rotation of the rotary panel assembly.

12. The separation system according claim 11, wherein the piggybacking detection device comprises a converter box and a power supply, wherein the sensor, the converter box, and the power supply are in operable communication such that the power supply provides power to the sensor and the converter box and the converter box receives digital data from the sensor and is configured to convert the digital data to an analog signal to control the rotation of the rotary panel assembly of the lockable turnstile.

13. The separation system according claim 11, further comprising an access control system in operable communication with the turnstile controller and the piggybacking detection device, the access control system configured to identify a user as either an authorized user or an unauthorized user and send a signal to at least one of the turnstile controller or the piggybacking detection device that identifies a user present in front of the lockable turnstile as authorized or unauthorized.

14. The separation system according claim 11, wherein the access control system comprises at least one of a badge reader or a biometric identification device.

* * * * *